Figure 6:
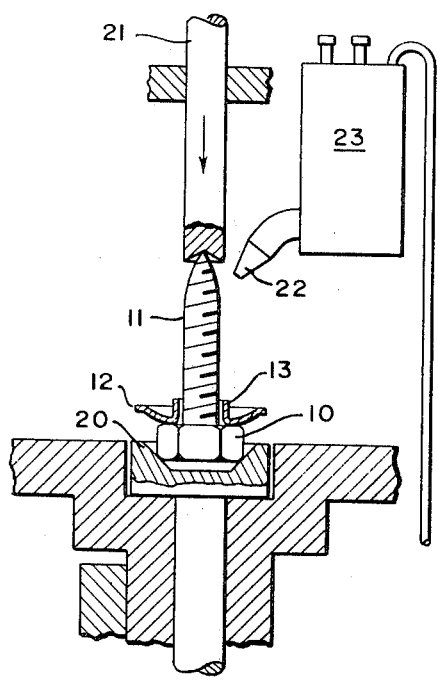

United States Patent

[11] 3,584,531

[72] Inventor Richard J. Greenleaf
      Ipswich, Mass.
[21] Appl. No. 835,037
[22] Filed June 20, 1969
[45] Patented June 15, 1971
[73] Assignee Barwood Manufacturing corp.
      Everett, Mass.

[54] SEALING FASTENER
     1 Claim, 8 Drawing Figs.
[52] U.S. Cl. .................................................. 85/1, 85/50
[51] Int. Cl. .................................................. F16b 35/00,
                                                                F16b 43/00
[50] Field of Search .......................................... 85/1 JP, 1,
           50; 151/14.5, 14 DW, 7, 37, 38; 264/263, 268,
                                                           309, 310

[56]                References Cited
              UNITED STATES PATENTS
2,176,411   10/1939   Washer .......................... 85/50
3,452,636   7/1969    Cohen et al. .................... 85/1 JP
3,519,279   7/1970    Wagner .......................... 85/1 JP
2,927,495   3/1960    Barwood ........................ 85/1 JP
3,086,421   4/1963    Hamman ........................ 85/1 JP
3,221,792   12/1965   Poupitch ........................ 151/38
3,286,577   11/1966   Weidner ......................... 85/50
3,304,827   2/1967    Bush .............................. 151/38
3,316,338   4/1967    Rieke ............................. 151/7
3,399,589   9/1968    Breed ............................. 85/1
3,422,721   1/1969    Yonkers ......................... 85/1 JP
3,469,490   9/1969    Pearce ........................... 85/1
3,472,534   10/1969   Stevens .......................... 85/1
3,500,712   3/1970    Wagner .......................... 85/50

Primary Examiner—Marion Parsons, Jr.
Attorney—Kenway, Jenney and Hildreth

ABSTRACT: The disclosure is of a novel sealing washer designed for use in a threaded fastener assembly. The washer is characterized by a domed and perforated backing member, preferably of metal, having an outer rim and an inner flange divided into a pattern of projecting segments providing spaced radial passages and terminating in a common plane offset in advance of the plane of the outer rim. The backing member carries a ring of plastic sealing compound that surrounds the segments and may flow freely through the passages between them and enter the threads of a screw or bolt when assembled in the fastener. The sealing washer thus described is in itself a sealable product or it may be distributed as a unit or as a part of the assembled fastener. The disclosure also describes a novel process of assembling the elements of the complete fastener characterized by applying a complete ring of viscous sealing compound to a perforated backing member while rotating with a headed screw and simultaneously forming spaced radial sprues extending inwardly to the thread of the screw or bolt.

PATENTED JUN 15 1971
3,584,531
SHEET 1 OF 3
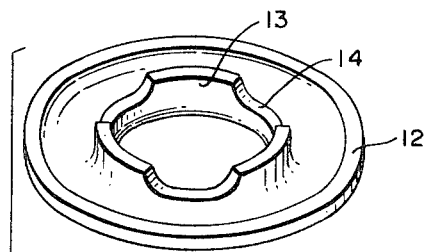
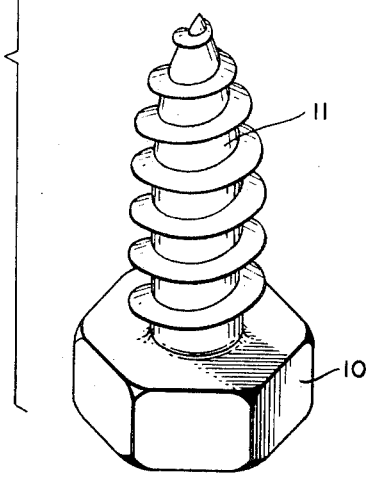
FIG. 1
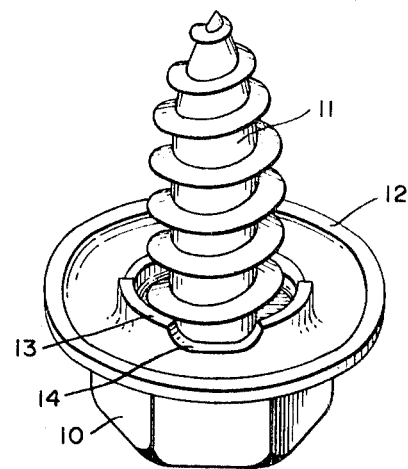
FIG. 2
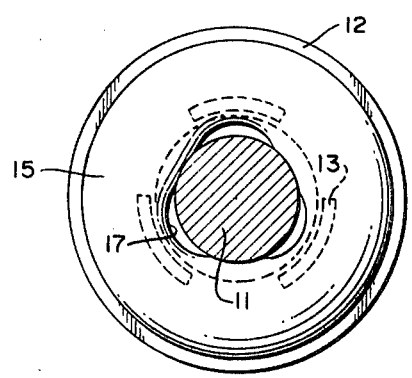
FIG. 3
INVENTOR.
Richard J. Greenleaf
BY
Kenway, Jenney & Hildreth
Attys.

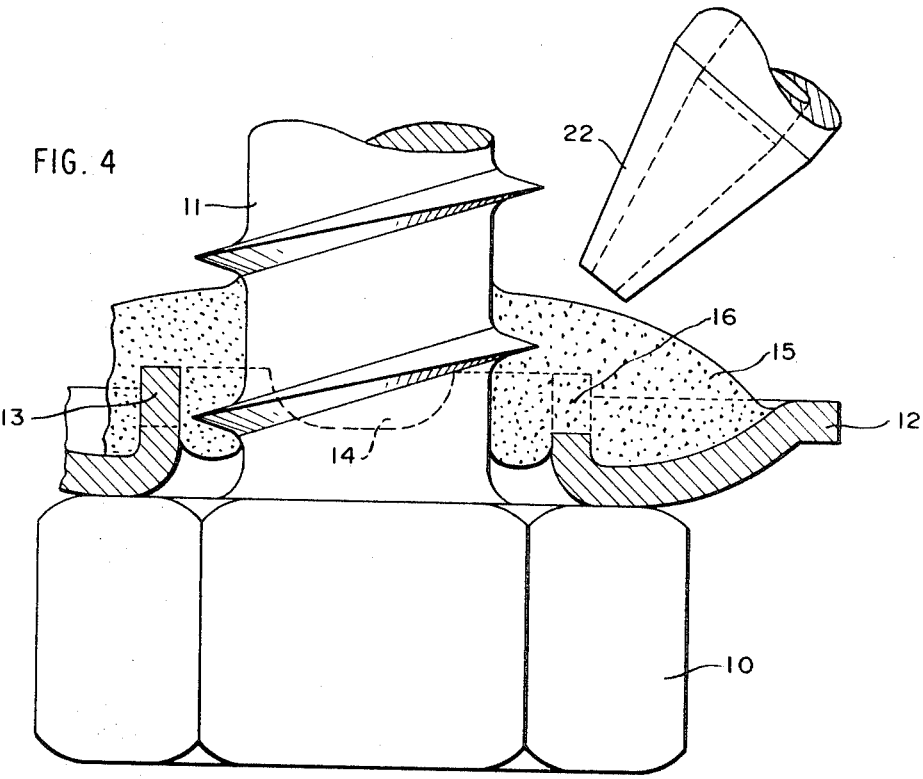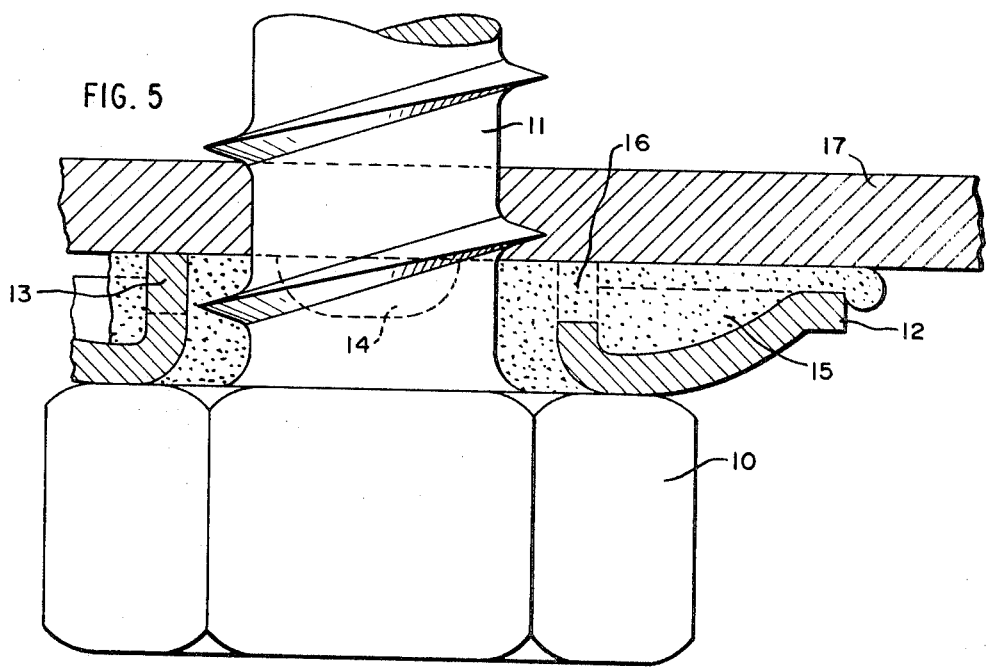

SEALING FASTENER

The backing member is of domed contour with an outer rim and an inner flange divided into a circular pattern of spaced segments or upright extrusions. The sealing compound is applied to the concave side of the backing member in such a manner that it may be caused to flow outwardly to the confines of the outer rim and inwardly completely to encompass the segments and fill any clearance space beneath the head of the screw. As a result of the spaced segments the inner edge of the sealing band becomes triangular in contour. The band has in effect two internal diameters, the larger lying between the rounded apices and the smaller lying between the flat sides of the triangle. Both of these diameters are less than the major diameter of the threaded shank of the screw. An advantage of this triangular shaped band is that the sealing compound offers two-stage resistance to secondary assembly of the washer on the screw and still provides sufficient frictional effect to retain the washer upon the shank of the screw during shipment and up to the point of installation. This triangular transfiguration is also advantageous in ensuring that the sealing compound enters and fills the minor diameter of the screw threads so that when torque is applied a minimum compression is effective in completing the desired seal.

By applying a predetermined measured amount of sealing compound to the underside of the domed washer downward pressure exerted by the screw will cause the sealing compound to flow inwardly and completely fill the clearance hole about the threads of the screw and all inner voids that may exist in the elements of the connection. When these internal voids have been completely filled the remainder of the sealing compound is caused to flow outwardly under the flanged rim so as to create a circular seal beneath the rim and isolate the underside of the washer from direct contact with the underlying fastened structure.

This desired result is accomplished because horizontal plane of the ends of the projecting segments is offset axially with respect to the horizontal plane of the outer rim, that is to say, the ends of the segments are so located as to engage the surface of the fastened member; therefore does not allow the outer rim to make contact therewith.

The segments are separated by passages extending through the inner flange of the backing member and in such passages the inner flange is reduced to a low ridge that will not cut the sealing compound and therefore will not isolate the inner from the other sealed areas. The sealing compound remains homogeneous and integrally united within the confines of the passages between adjacent segments. When the segments bear against the fastened structure they keep the washer from rotating. The segments assume the full load of the driven fastener and even torque values in excess of requirement will not result in excessive protrusion of the sealing compound beyond the outer rim of the backing member.

It will be understood that the unitized fastener assembly comprises a headed screw or bolt designed to meet customer's specifications and use requirements, and the composite washer carrying on its concave face a ring of a compatible sealing compound.

The complete fastener may be assembled in accordance with a novel process characterized by applying a complete ring of viscous sealing compound to a perforated disc rotating with a head screw and simultaneously forming spaced radial sprues or branches extending inwardly from the inner edge of the ring. In addition to the reduction in costs a sealing fastener of superior character is produced in which the sealing compound flows into a completely fills all leakage cavities between the underside of the head and the fastened structure. A minimum amount of compression is therefore required to create a complete seal. This is a distinct advantage over other sealing fasteners in which a washer is held by means of mechanical metal-to-metal contact requiring considerable initial compression to cause flow of the sealing compound into the internal cavity of the joint.

Figure 7:
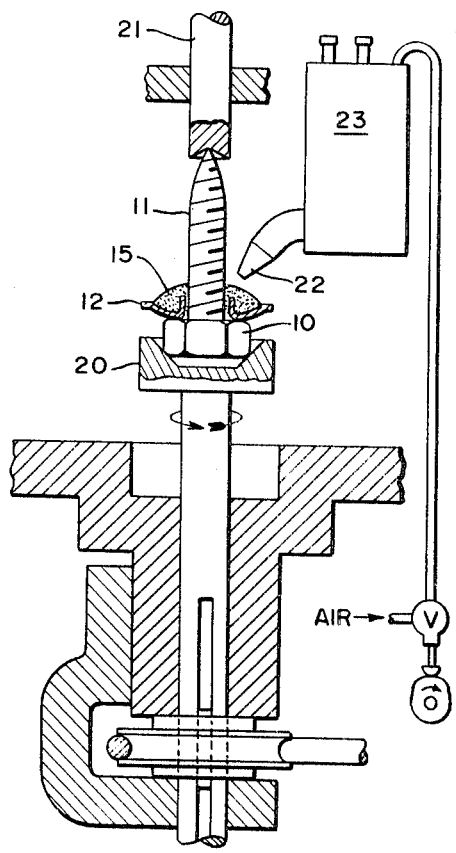
Figure 8:
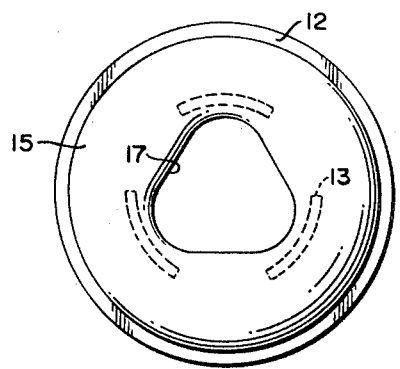

These and other features of the invention will be best understood and appreciated from the following description of the fastener in a preferred form, together with one type of apparatus by which it may be put together, all as shown in the accompanying drawings, in which:

FIG. 1 is a view in perspective showing the screw and washer disassociated,

FIG. 2 is a view in perspective showing the screw and washer assembled in inverted position, FIG. 3 is a plan view showing the underside of the composite fastener, FIG. 4 is a diagrammatic view on an enlarged scale showing the step of applying the sealing ring to the washer, FIG. 5 is a similar view showing the fastener in set and sealed condition, FIGS. 6 and 7 are sectional diagrammatic views of apparatus for use in the step of applying the sealing ring to the washer, and FIG. 8 is a plan view showing the underside of the composite washers.

The invention is illustrated in connection with a fastener including a self-tapping screw with a head 10 and threaded shank 11. The fastener includes a washer having an outer rim 12, a dished body and a circular pattern of segments 13 which provide an inner wall with ports or passages 14. The segments 13 terminate in a common plane offset inwardly with respect to the plane of the outer rim 12 as best seen in FIGS. 4 and 5. The body of the washer is upwardly concaved or dished while the segments 13 bound the hole in the washer leaving slight clearance between the inner wall of the segments and the OD of the screw thread.

A sealing ring 15 of polyvinyl chloride or the like is herein shown as applied to the concave surface of the washer by apparatus such as that shown in FIGS. 6 and 7. This includes a spinning chuck 20 and a cooperating tail stock 21 between which the screw is centered for rotation with a washer resting on the head 10 of the screw. The sealing compound is applied from a nozzle 22 leading from a reservoir 23 in accurately measured shots controlled by valved compressed air connections. The rotating screw and washer are elevated toward the nozzle 22 as suggested in FIG. 7 and the ring 15 applied in such an amount as just to enclose the segments 13. In this step the sealing compound flows inwardly through the ports or passages 14 between the segments, reaching the bottom of the thread of the screw and at the same time providing radial sprues or branches 16 which connect the body of the sealing ring with the inner portion thereof which surrounds the threaded shank 11.

In applying the sealing compound in this manner it will be found that the inner edge wall 17 of the sealing ring assumes a triangular formation as best shown in FIG. 3. The minimum diameter of this hole is less than the OD of the thread so that the sealing ring makes firm yielding and binding engagement with the shank of the screw and holds these two elements in assembled relation as seen in FIG. 2 and 6.

The triangular contour imparted to the ID of the sealing ring is produced by the inward flow of the sealing compound through the passages 14 between adjacent segments 13, while the edge of the ring is molded between the passages into contact with the outer faces of the segments 13, thus locating the position of maximum diameter. Each complete sealing fastener is thus maintained, without loose parts, in readiness for immediate use.

To summarize, it may be noted that the metallic washer is semidome shaped with a flanged perimeter and an ID surrounded by symmetrically segmented radial extrusions, the ends of which project below the horizontal plane of the outer flange. The metallic washer being semidome shaped, produces a gland packing effect driving the sealing material inward when compressed under torque. The advantages of the segmented extrusions are twofold. When torque is applied the sealing material is forced inwardly and flows through the passages between the upright segments, around the threads, into the minor diameter and up under the head of the fastener. In addition, the sealing material flows sufficiently beyond the outer diameter of the washer so as to not allow a metal-to-metal contact at the outer rim circle of seal. Also, excessive torques can be applied to the fastener assembly without injurious effect on the sealing member. Finally, the extruded segments projecting beyond the horizontal plane of the outer rim accept the full torque load of the driven fastener assembly, and therefore any desired initial torque values can be created and maintained. Three segments are advantageous because they ensure even bearing and find their own plane of contact with the workpiece.

The sealing compound may be of plasticized PVC, neoprene or other rubbery material having similar characteristics.

Having thus disclosed the invention in a preferred manner of carrying it out, I claim as new and desire to secure by Letters Patent.

1. A sealing fastener including a screw having a head and threaded shank assembled with a backing washer perforated to receive said shank, the washer having an annular outer rim and an inner circular pattern of axially projecting segments surrounding the perforation of the washer and arranged to provide a three-point bearing against a workpiece fastened beneath the head of the screw and providing spaced radial passages, and a ring of plastic sealing compound having an aperture of triangular shape for binding engagement with the shank of the screw and being carried concentrically by the washer outside the said segments and in position to flow inwardly through the passages to fill the threads of the shank when the washer is subjected to pressure.